United States Patent
Cech

(10) Patent No.: US 8,424,904 B2
(45) Date of Patent: Apr. 23, 2013

(54) STEERING WHEEL SYSTEM WITH AUDIO INPUT

(75) Inventor: Leonard Cech, Brighton, MI (US)

(73) Assignee: TK Holdings Inc., Auburn Hills, MI (US)

( * ) Notice: Subject to any disclaimer, the term of this patent is extended or adjusted under 35 U.S.C. 154(b) by 149 days.

(21) Appl. No.: 12/914,740

(22) Filed: Oct. 28, 2010

(65) Prior Publication Data

US 2011/0101654 A1    May 5, 2011

Related U.S. Application Data

(60) Provisional application No. 61/272,751, filed on Oct. 29, 2009.

(51) Int. Cl.
   *B60R 21/203* (2006.01)
   *B60R 21/215* (2011.01)
   *H04R 1/02* (2006.01)
   *H04R 3/00* (2006.01)

(52) U.S. Cl.
   USPC ............ 280/728.3; 280/731; 381/86; 381/91; 381/122; 381/365

(58) Field of Classification Search ............... 280/728.3, 280/731; 381/91, 92, 122, 86, 355, 361, 381/365; 455/569.2
   See application file for complete search history.

(56) References Cited

U.S. PATENT DOCUMENTS

| | | | | |
|---|---|---|---|---|
| 4,126,827 A * | 11/1978 | Negrini | ........................ | 455/90.3 |
| 4,578,592 A * | 3/1986 | Nakazawa et al. | ............ | 307/10.1 |
| 4,614,839 A * | 9/1986 | Umebayashi | ............... | 455/556.1 |
| 4,698,838 A * | 10/1987 | Ishikawa et al. | ............ | 455/569.2 |
| 4,729,254 A * | 3/1988 | Nogami et al. | .............. | 74/484 R |
| 4,850,015 A * | 7/1989 | Martin | ........................... | 379/446 |
| 5,319,803 A * | 6/1994 | Allen | ............................. | 455/566 |
| 5,418,836 A * | 5/1995 | Yazaki | ........................ | 455/569.2 |
| 5,851,022 A * | 12/1998 | Yamamoto et al. | ......... | 280/728.3 |
| 6,114,774 A * | 9/2000 | Fiegura | .......................... | 307/9.1 |
| 6,240,347 B1 * | 5/2001 | Everhart et al. | .................. | 701/36 |
| 6,567,676 B1 * | 5/2003 | Tsai | ............................ | 455/569.2 |
| 6,928,614 B1 * | 8/2005 | Everhart | ....................... | 715/728 |
| 6,983,170 B2 * | 1/2006 | Stulberger | ................. | 455/556.1 |
| 7,097,199 B2 * | 8/2006 | Dearden et al. | ............ | 280/728.3 |
| 7,106,876 B2 * | 9/2006 | Santiago | ....................... | 381/369 |

(Continued)

FOREIGN PATENT DOCUMENTS

| EP | 1 493 993 A1 | 1/2005 |
|---|---|---|
| EP | 1 695 873 B1 | 7/2008 |

(Continued)

OTHER PUBLICATIONS

International Preliminary Report on Patentability PCT/US2010/054414 dated May 1, 2012.

*Primary Examiner* — Paul N Dickson
*Assistant Examiner* — Laura Freedman
(74) *Attorney, Agent, or Firm* — Foley & Lardner LLP

(57) ABSTRACT

A steering wheel system for a vehicle includes a steering wheel and an airbag module located within the hub portion of the steering wheel. The airbag module includes an airbag and a cover for the airbag. The steering wheel system also includes at least one microphone configured to receive audio input from a vehicle driver in which the at least one microphone is located on the cover of the airbag module.

18 Claims, 4 Drawing Sheets

U.S. PATENT DOCUMENTS

| | | | |
|---|---|---|---|
| 7,374,203 B2 * | 5/2008 | Hirzmann | 280/731 |
| 7,441,801 B2 * | 10/2008 | Nakamura et al. | 280/731 |
| 7,826,623 B2 * | 11/2010 | Christoph | 381/92 |
| 8,102,995 B2 * | 1/2012 | Kim | 379/420.03 |
| 2002/0031234 A1 * | 3/2002 | Wenger et al. | 381/86 |
| 2002/0047255 A1 * | 4/2002 | Baume et al. | 280/775 |
| 2006/0125217 A1 * | 6/2006 | Nakamura et al. | 280/731 |
| 2009/0121459 A1 * | 5/2009 | Bostick et al. | 280/728.3 |
| 2009/0189373 A1 * | 7/2009 | Schramm et al. | 280/731 |
| 2009/0192677 A1 * | 7/2009 | Cech et al. | 701/41 |
| 2009/0192795 A1 * | 7/2009 | Cech | 704/233 |

FOREIGN PATENT DOCUMENTS

| | | | |
|---|---|---|---|
| EP | 2 045 140 B1 | | 1/2010 |
| EP | 2 051 241 B1 | | 12/2010 |
| JP | 60072421 A | * | 4/1985 |
| JP | 60076445 A | * | 4/1985 |
| JP | 03248699 A | * | 11/1991 |
| JP | 2000-177509 | | 6/2000 |
| JP | 2002127911 A | * | 5/2002 |
| JP | 2004-198702 | | 7/2004 |
| JP | 2008-20872 | | 1/2008 |

* cited by examiner

STEERING WHEEL SYSTEM WITH AUDIO INPUT

CROSS REFERENCE TO RELATED APPLICATIONS

The present application claims priority to and the benefit of U.S. Provisional Patent Application No. 61/272,751, filed Oct. 29, 2009. The foregoing provisional application is incorporated by reference herein.

BACKGROUND

The present application relates to the field of audio input systems in vehicles. More specifically, the disclosure relates to audio input systems that can be incorporated into an emblem, such as on a steering wheel.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Figure 1:
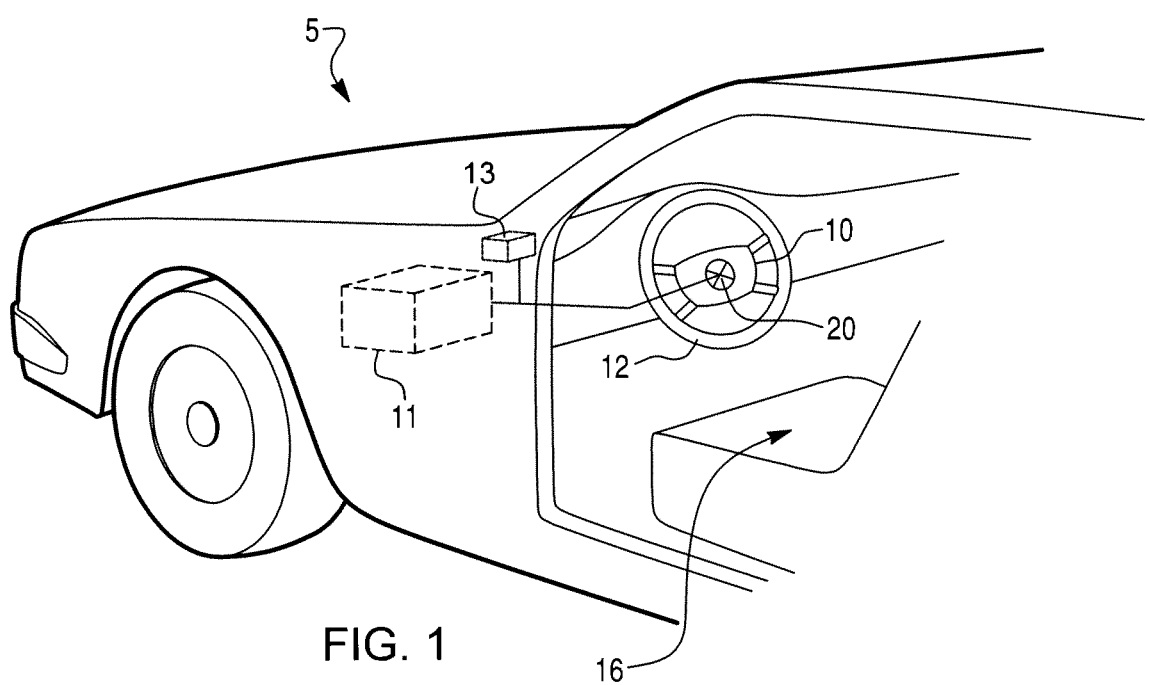
FIG. 1 is a perspective view of the interior of a vehicle illustrating the location of a steering wheel and driver's side airbag.

According to various exemplary embodiments, vehicles may incorporate one or more microphones to support hands-free and voice activation applications. The microphones may be incorporated in vehicle headliners, steering column shafts, rear view mirrors, and other locations on the instrument panel or A-pillar trim. Some microphones may serve as a primary driver voice input while others may be used to collect cockpit background sound to support noise cancellation. These microphones may be optimized to collect sounds from a specific angle (directional) or from any angle (omni-directional) depending on the number of microphones, the location of the microphones, and the audio input system design. The majority in-vehicle audio input system may support voice input from the driver and/or other passengers in the vehicle. According to one exemplary embodiment, one or more microphones may be positioned within a gap formed between the steering wheel frame and the airbag hub as disclosed in U.S. Pat. No. 7,374,203, which is herein incorporated by reference in its entirety.

Airbags are provided in vehicles to restrain occupants in the event of a vehicle crash. It is desirable to retain the integrity of airbag module components, such as a cover (sometimes referred to as a deployment door), an emblem, and/or other decorative features placed on the surface of the deployable cover, during deployment of the airbag. It is desirable to reduce the likelihood of any such components becoming detached during airbag deployment and becoming projectiles. Any features incorporated with the airbag module should have robust attachment methods to withstand deployment forces throughout various environmental conditions. Attributes that can facilitate retention during deployment include low mass and increased flexibility of various features.

Microphones of audio input systems are not currently used on the cover or door of an airbag module. Incorporating one or more microphones on the door or cover of the airbag module may provide a low mass audio input suitable for withstanding the high energy of airbag deployment. A vehicle driver audio input microphone array may be integrated within an emblem element affixed on the surface of an airbag cover in the center hub of a steering wheel assembly. Such emblems (e.g., a flexible emblem) may be composed of plastic and/or metal and incorporate a vehicle nameplate or OEM insignia with the emblem center positioned at the center of the steering axis of rotation. The emblem may resist shattering and reduce the likelihood of emblem and/or airbag cushion damage due to sharp edges formed during airbag deployment. The emblem may withstand automotive environmental and lifetime specifications and be sufficiently thin and low mass as to not affect airbag deployment. Typically, the airbag is designed so that the emblem remains affixed to the cover as disclosed in U.S. Pat. No. 7,097,199, which is herein incorporated by reference. The emblem may be relocated to a new position after deployment of the airbag. The tear seams on the airbag cover and the routing and placement of components associated with the microphone system can be designed so that the microphone system can be intact and potentially functional after the deployment of the airbag.

In an exemplary embodiment, a microphone array can be attached to an airbag cover and/or emblem or, alternatively, positioned between the cover and emblem, therefore providing a microphone array positioned for increased accuracy in receiving driver commands. The power source for the microphone array may be located in a remote non-critical area of the airbag module or other part of the vehicle.

FIG. 1 illustrates a vehicle 5 according to an exemplary embodiment. The vehicle 5 includes a steering wheel 12, which includes a center portion or hub. An airbag module 10 is positioned in the hub of the steering wheel 12. In the event of a vehicle crash, the airbag module 10 is configured to deploy an airbag cushion 14 into a vehicle occupant compartment 16. An emblem 20 is generally mounted on a center of the airbag module 10. The emblem 20 may include one or more microphones (not shown) positioned, for example in an array. The microphones may be powered by a power source 11 and configured to receive voice commands or audible inputs for transmission to an electronic processing circuit or system 13. The power source 11 and/or the electronic processing system 13 may be located as shown in FIG. 1 or positioned in any other remote non-critical area (i.e., in an area not disturbed by initiation of an inflator and deployment of an airbag) of the airbag module 10 or the vehicle 5 according to other exemplary embodiments. The electronic processing system 13 may be any digital or analog electronics configured to process electronic signals generated by audio input and/or to provide electronic signals for audio output. For example, the electronic processing system 13 may receive an output signal provided by a microphone and provide a corresponding command signal to other vehicle systems that can take direction from a driver of a vehicle. Many vehicle systems can be controlled by driver commands such as, for example, telephone, entertainment, vehicle controls, environmental and atmospheric controls, etc. The electronic processing system 13 may include a software module configured to process electronic signals and configured for execution on a processor. The electronic processing system 13 may be integrated with other vehicle electronics (e.g., an electronic control unit (ECU) used for other vehicle systems) or may be a standalone module.

Figure 2B:
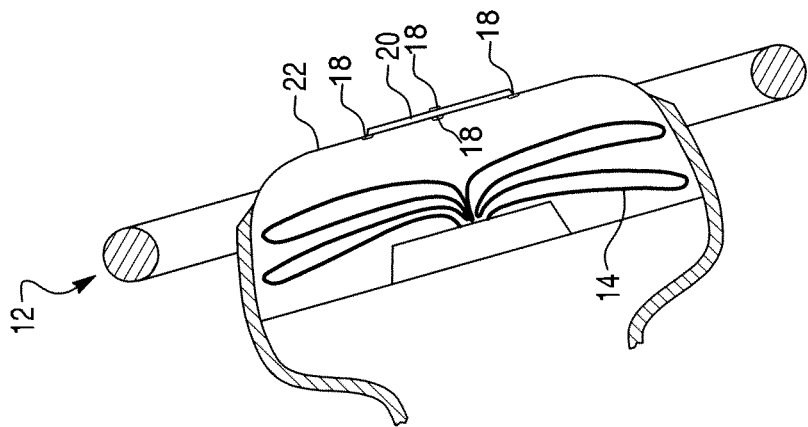
FIG. 2B is a cross section of the steering wheel illustrated in FIG. 2A.
Figure 2A:
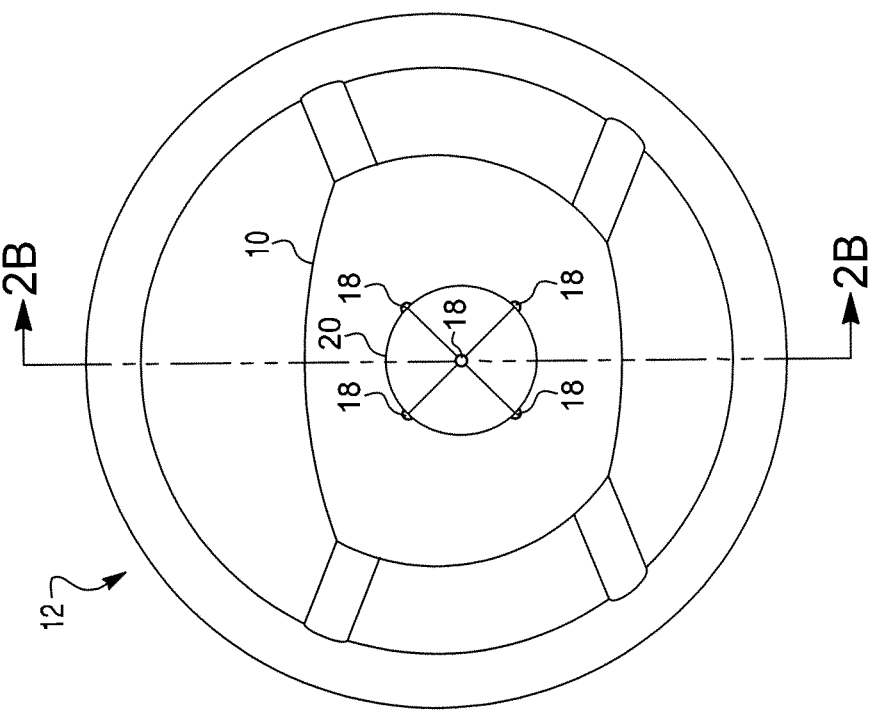
FIG. 2A is a front view of a steering wheel illustrating an emblem positioned on an airbag module.

Referring to FIGS. 2A and 2B, the steering wheel 12 is shown configured with an airbag module 10. The airbag module 10 is generally located in the hub of the steering wheel 12 and includes an airbag cushion 14, an airbag cover 22 configured to break open along tear seams to allow the airbag cushion 14 to deploy in the event of a vehicle crash, an emblem 20 attached to the cover 22, and one or more microphones 18 connected to the airbag cover 22 and/or the emblem 20. The microphones 18 may be included on the front, side, or rear surfaces of the emblem 20, or alternatively within the gap formed by the airbag cover 22 and the emblem 20 for receiving audio from the driver while reducing audio received from other vehicle occupants or road/engine noise. The one or more microphones can be connected to the electronic processing system 13 that may include additional signal processing electronics (e.g. noise cancellation, A/D converter, amplifiers, etc.). The microphones 18 are preferably isolated from both in-vehicle noise sources (e.g., blowers, stereo speakers, passengers, engine, etc.) and from external audible noise sources (e.g., rain, hail, wind, road noise, etc.). According to one embodiment, the emblem and the microphones 18 may be integrated as a single component, thereby reducing the number of components in the vehicle. According to various exemplary embodiments, the one or more microphones 18 may be digital and/or analog micro-electromechanical (MEM) microphones (e.g., the AKU2002C microphone available from Akustica, Inc.). It is noted that while five microphones 18 are illustrated, according to some exemplary embodiments, more or less than five microphones may be used.

Figure 3A:
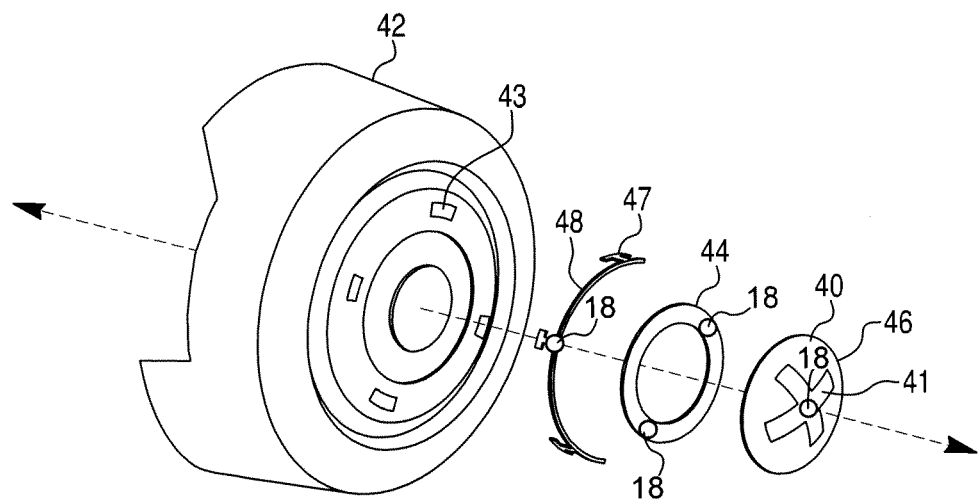
FIG. 3A is an expanded view of a microphone array used in conjunction with an emblem.
Figure 3B:
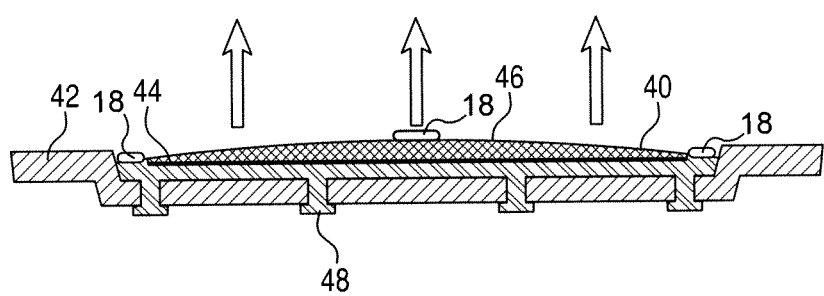
FIG. 3B is a side view of a microphone array shown in FIG. 3A.

Referring to FIGS. 3A and 3B, according to another exemplary embodiment, an emblem 40 (e.g., having a contour resembling a dome or other shape) may include a design 41. The design may be screen printed onto the emblem 40 using translucent and/or opaque inks, may be engraved or etched out of the emblem 40, may be fastened onto the emblem 40, etc. The steering wheel system shown in FIGS. 3A and 3B, may include a printed circuit board (PCB) 44 that may be positioned between the emblem 40 and the airbag cover 42 and can be electrically coupled to a conductor 48 that can be mechanically fastened to the airbag cover 42. As shown in FIG. 3A, the printed circuit board (PCB) 44 may be arranged around the periphery of the hub of the steering wheel. For example, the PCB 44 may have a ring shape. The conductor 48 may be a wiring harness 48 that may contain pins 47 that can be snapped into corresponding mating sockets 43 located on the cover of airbag 42. The ends of the pins 47 serve to electronically couple the wiring harness 48 and PCB 44 to the power source 11.

One or more microphones 18 may be located or mounted on any of the emblem 40, the PCB 44, and/or the wiring harness 48. Each of the microphones 18 are electrically coupled to the wiring harness and PCB 44 and receive power from the power source 11 and send signals representative of audio inputs to the electronic processing system 13. While four microphones 18 are illustrated, according to other embodiments, more or less microphones may be used. If more than one microphone 18 is included, each microphone 18 can be apportioned to serve as a primary driver audio input (directional or omni-directional), a secondary driver audio input for symmetric phase noise cancellation, or as a background noise input (directional or omni-directional) depending on the audio quality and electronics required. Depending on circuit requirements and size, additional audio electronics (digital and/or analog) may be packaged within the emblem 40 itself in order to optimize the audio signal. The output could be either digital or analog depending on the steering wheel electronics and clockspring characteristics.

According to some exemplary embodiments, the electrical connections between the microphones 18 and the power source and electronic processing system may be similar to the electronic connections in commonly assigned U.S. patent application Ser. No. 11/979,952, which is herein incorporated by reference in its entirety. The electrical connections may provide power and an audio signal path from the one or more microphones 18 to the electronic processing system.

Figure 4:
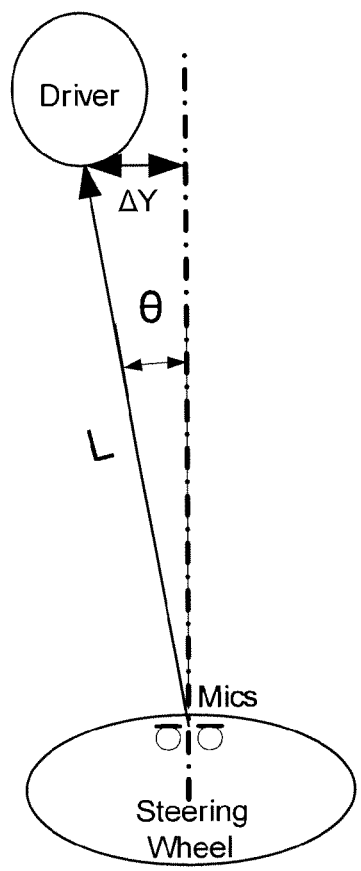
FIG. 4 is a schematic diagram of illustrating a relationship between microphones on a steering wheel and a driver.
Figure 5:
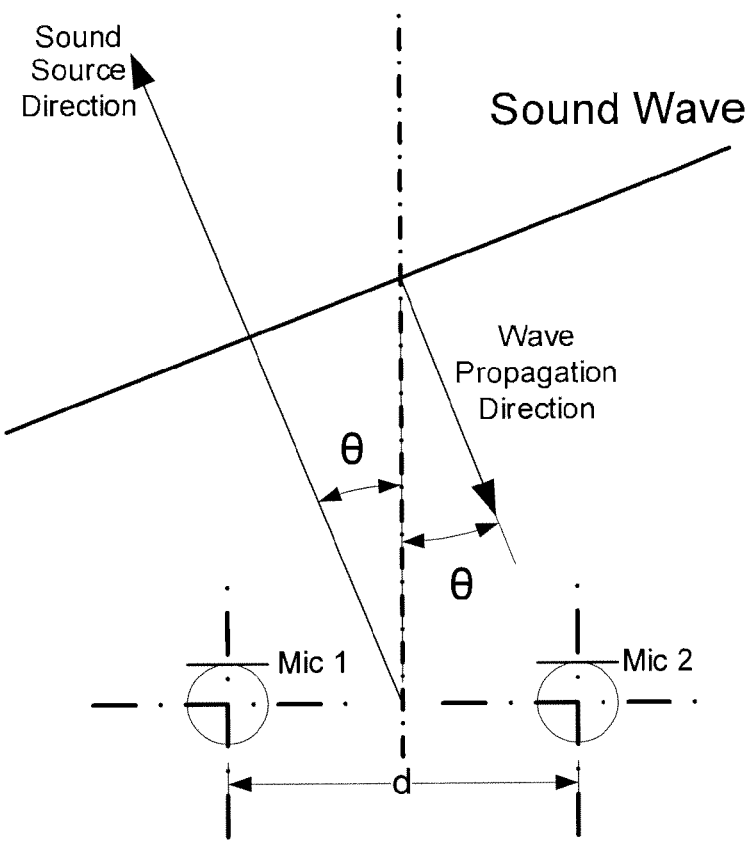
FIG. 5 is a schematic diagram of illustrating a relationship between microphones on a steering wheel and a driver.

Referring to FIGS. 4 and 5, one of many possible configurations for the microphones 18 is illustrated according to an exemplary embodiment. The width or diameters of many emblems (e.g., less than or equal to about four inches) fall within a range that is nearly optimal for the desired geometric spacing for noise cancellation for a driver. Using an estimate for peak audible frequency for human speech as about 3500 Hz and a spatial separation of about 4.9 cm (about two inches) may provide the optimal potential for noise cancellation using phase cancellation. However, reduced separation can also provide less noise cancellation benefits. When considering the position of a drivers head, relative to the vehicle interior, the closest distance orthogonal to the plane of the mouth may be on the steering wheel. Audible power falls off as distance squared and a microphone positioned in the steering wheel hub provides one of the shortest ranges with minimal need for the driver to reposition the head from maintaining view of the road.

A summary of the physical principals are illustrated in FIGS. 4 and 5. Sound travels at about 343 m/s and human speech has a frequency of about 3500 Hz, which results in a wavelength of about 9.8 cm. The microphone array spatially samples at the intra-microphone spacing wavelength. If $\lambda/2 < d$ (4.9 cm<d), then the signal will be aliased. The microphone spacing "d" may be less than about 4.9 cm in order to not alias speech frequencies from about 0 to 3500 Hz. In other exemplary embodiments, the spacing "d" may be greater than about 4.9 cm. In general, for superior noise reduction "d" should be maximized. Therefore, in order to reduce aliasing of desired or common speech frequencies and to provide good noise reduction, the distance "d" may be at the maximum spacing that will reduce the aliasing. For example, for speech frequencies up to about 3500 Hz, the optimal spacing between microphones may be about 4.9 cm (about 1.9 in).

The placement of the microphones 18 in a position the driver is facing during general driving (i.e., driver eyes on road) may result in voice commands from the driver having the highest possible amplitude (of voice intensity) based on a line of sight between the driver mouth and the microphones. The use of multiple microphones 18 positioned at known points from the steering wheel center line may further improve detected voice amplitude. If a driver is facing forward and the steering angle is within typical driving ranges, audio inputs reached at each microphone may be very close in phase. However for other sounds received at each of the microphones 18, such as noise from a passenger and other noise (e.g., from the road, engine, fan, wind, etc.), the phases are different because the sources of the noise are not equidistantly directed towards the microphones 18. Stereo noise cancellation techniques can be used to clarify the speech of the driver from the stereo microphones 18 to improve the audible input recognition. Because the noise is detected to be out of phase and audio input of the driver is detected to be in phase, the electronic processing system 13 may be configured to cancel or eliminate at least a portion of the "non-driver" noise from the audio output signal received from the microphones.

FIG. 4 shows the driver positioned off the center line by a distance ΔY at a distance L from the microphone. If the driver is not positioned on the center line of the steering wheel (as illustrated), each microphone 18 receives a sound wave from the driver at different times or in different phases. Because the microphone 18 distance is generally fixed, the electronics 13 may determine the angle θ the driver is off center based on the difference in time it takes for the sound to reach each microphone. Once the angle θ is determined, the electronics 13 can adjust the phase of the audio received at each microphone 18 to be in phase for optimal voice recognition.

According to various exemplary embodiments, the microphone emblem provides the shortest acoustic path between the driver's mouth and the microphone element for improved noise reduction. Optimal driver audio input may be achieved when the driver gaze is on the forward roadway and the driver is "trained" to speak into the microphone for optimal audio or voice recognition performance. While electronic processing may be performed at the electronics 13, according to other exemplary embodiments, the processing may be performed at the source of audio input (e.g., the microphones 18). It is noted that the illustrated and described design for driver acoustical input is independent of vehicle model, size and interior layout as the driver position to the steering wheel and logo are generally the same platform by platform.

It is important to note that the construction and arrangement of the audio input system shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the description. For example, elements shown as integrally formed may be constructed of multiple parts or elements, the position of the elements may be reversed or otherwise varied, and the nature or number of discrete elements or positions may be altered or varied. Other substitutions, modifications, changes and omissions may be made in the design, operating conditions and arrangement of the exemplary embodiments.

What is claimed is:

1. A steering wheel system for a vehicle, comprising:
a steering wheel including a hub portion;
an airbag module located within the hub portion, wherein the airbag module includes an airbag and a cover for the airbag;
an emblem located on the cover of the airbag module; and
at least one microphone configured to receive audio input from a vehicle driver, the at least one microphone being located on the cover of the airbag module,
wherein the at least one microphone is located on the emblem.

2. The steering wheel system of claim 1, further comprising an electronic processing system configured to process an output signal generated by the at least one microphone in response to the audio input.

3. The steering wheel system of claim 2, further comprising a plurality of microphones.

4. The steering wheel system of claim 3, wherein the plurality of microphones are spaced at a distance configured to reduce aliasing of human speech and to maximize noise reduction.

5. The steering wheel system of claim 3, wherein the plurality of microphones are configured to receive external audio input that is not from the driver, and wherein the electronic processing system is configured to cancel the received external audio input that is not from the driver.

6. The steering wheel system of claim 3, wherein the electronic processing system includes a printed circuit board and at least one of the plurality of microphones is located on the printed circuit board.

7. The steering wheel system of claim 1, wherein the at least one microphone comprises at least one of a digital micro-electromechanical microphone and an analog micro-electromechanical microphone.

8. The steering wheel system of claim 1, wherein the emblem is generally mounted on a center of the airbag module.

9. The steering wheel system of claim 1, wherein the emblem and the at least one microphone are integrated as a single component.

10. A steering wheel for a vehicle, comprising:
a microphone configured to receive audio input from a vehicle driver;
an emblem located on a hub portion of the steering wheel; and
an electronic processing system for processing an output signal from the microphone, wherein the electronic processing system is mounted behind the emblem;
wherein the microphone and the electronic processing system are connected by a conductor; and
wherein the microphone is located on at least one of the emblem, the electronic processing system, and the conductor.

11. The steering wheel system of claim 10, wherein the conductor comprises a wiring harness.

12. The steering wheel system of claim 10, further comprising a plurality of microphones.

13. The steering wheel of claim 12, wherein the plurality of microphones are spaced at a distance configured to reduce aliasing of human speech and to maximize noise reduction.

14. The steering wheel of claim 12, wherein the microphones further receive external audio input that is not from the driver, and wherein the electronic processing system is configured to cancel the received external audio input that is not from the driver.

15. The steering wheel of claim 10, wherein the microphone comprises at least one of a digital micro-electromechanical microphone and an analog micro-electromechanical microphone.

16. An audio input system for a vehicle steering wheel including a hub portion, comprising:
an airbag module located within the huh portion, wherein the airbag module includes a cover and an emblem mounted on the cover;
a plurality of microphones configured to receive audio input from a vehicle driver, wherein at least one of the microphones is located adjacent to the emblem mounted on the cover, wherein the at least one of the microphones is located on at least one of a front surface of the emblem, a side surface of the emblem and a rear surface of the emblem; and
an electronic processing system for processing an output signal from the at least one of the microphones;

wherein the at least one of the microphones is configured to receive audio input that is not from the driver of the vehicle, and wherein the electronic processing system is configured to cancel the received audio input that is not from the driver.

17. The audio input system of claim 16, wherein the emblem is generally mounted on a center of the airbag module.

18. A steering wheel system for a vehicle, comprising:
a steering wheel including a hub portion;
an airbag module located within the hub portion, wherein the airbag module includes an airbag and a cover for the airbag;
an emblem located on the cover of the airbag module; and
at least one microphone configured to receive audio input from a vehicle driver, the at least one microphone being located on the cover of the airbag module,
wherein the at least one microphone is located on at least one of a front surface of the emblem, a side surface of the emblem and a rear surface of the emblem.

* * * * *